UNITED STATES PATENT OFFICE.

COURT KARL FRIEDRICH LEO GROSS, OF CHRISTIANIA, NORWAY.

PROCESS FOR MANUFACTURING SYNTHETIC CAOUTCHOUC.

1,090,847.  Specification of Letters Patent.  Patented Mar. 24, 1914.

No Drawing.  Application filed June 12, 1913.  Serial No. 773,249.

*To all whom it may concern:*

Be it known that I, COURT KARL FRIEDRICH LEO GROSS, a subject of the King of Norway, residing at Christiania, in the Kingdom of Norway, have invented certain new and useful Improvements in Processes for Manufacturing Synthetic Caoutchouc, of which the following is a specification.

My present invention has for its object a process for manufacturing synthetic caoutchouc by the polymerization of isoprene and is characterized thereby, that the conversion is effected by means of trioxymethylene (formaldehyde). According to the invention the process is suitably carried out in the following way: An open receptacle, containing isoprene and another open receptacle, containing trioxymethylene, eventually dissolved in water, are heated in an autoclave for from 1 to 3 hours to a temperature of from 100–200° C. The autoclave is left to cool. The greater part of the isoprene has then been converted into caoutchouc, forming a viscous mass, which is in the usual manner washed and dried. During the process it is observed that the trioxymethylene is changed, but the exact nature of this change has not been determined. It appears that the trioxymethylene does not combine in any way with the isoprene and it may be that the action of the trioxymethylene is merely that of a catalyst so far as the isoprene is concerned.

Having now described my invention what I claim and desire to protect by Letters Patent is:

1. The process of manufacturing caoutchouc from isoprene which comprises heating the isoprene in contact with trioxymethylene until a viscous mass is obtained.

2. The process of manufacturing caoutchouc from isoprene which consists in heating isoprene and dissolved trioxymethylene in a closed chamber to a temperature of from 100° C. to 200° C. for from 1 to 3 hours, cooling the materials and separating the caoutchouc so formed.

In testimony whereof I have affixed my signature in presence of two witnesses.

COURT KARL FRIEDRICH LEO GROSS.

Witnesses:
 M. E. GUCHORMSEN,
 RUTH LINDSTRÖM.